Dec. 20, 1938.   G. H. ROCKWOOD, JR   2,140,922
GRID CONTROLLED RECTIFIER CIRCUIT

Filed April 25, 1936

INVENTOR
G. H. ROCKWOOD, JR.
BY
ATTORNEY

Patented Dec. 20, 1938

2,140,922

UNITED STATES PATENT OFFICE 2,140,922

GRID CONTROLLED RECTIFIER CIRCUIT

George H. Rockwood, Jr., Orange, N. J., assignor to Bell Telephone Laboratories, Incorporated, New York, N. Y., a corporation of New York Application April 25, 1936, Serial No. 76,354

2 Claims. (Cl. 175—363)

This invention relates to electric power converting systems and more particularly to such systems wherein electric valves of the vapor electric discharge type are utilized for converting alternating current into direct current.

The conversion of alternating current into direct current by means of electric valves of various well-known types is extensively resorted to in the electrical field and systems have been heretofore proposed whereby various load voltage-load current characteristics have been obtained.

It is the object of this invention to provide an improved simplified electric power converting system involving the use of a grid-controlled rectifier which is regulated in such a manner as to have a substantially constant load voltage-load current characteristic up to full load and which is incapable of carrying an overload.

This object is attained in accordance with a feature of the invention by utilizing as the means for controlling the grid elements of the rectifier tubes, a potential derived from a non-linear resistance connected in series with the load.

In the preferred form of the invention the non-linear resistance comprises a ballast lamp having a characteristic such that, for current below its rated value, the voltage drop across it is small and for currents above its rated value the voltage drop rises rapidly. By selecting a resistance of this type, having a current rating substantially equal to the full load current, the rectifier may be made to have a characteristic which is substantially constant up to full load and then to fall away rapidly as the load current exceeds the full load value.

Figure 1:
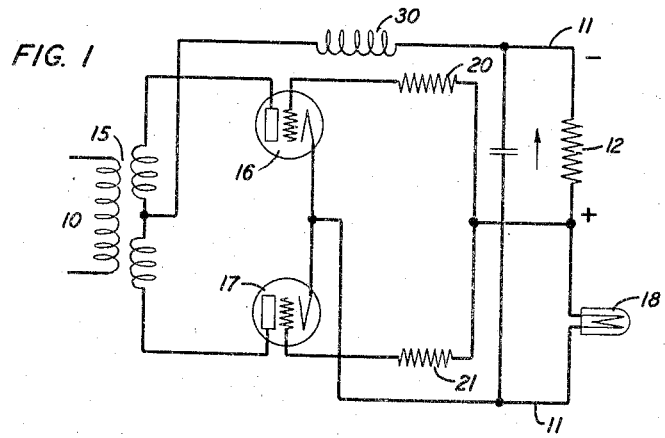
Figure 2:
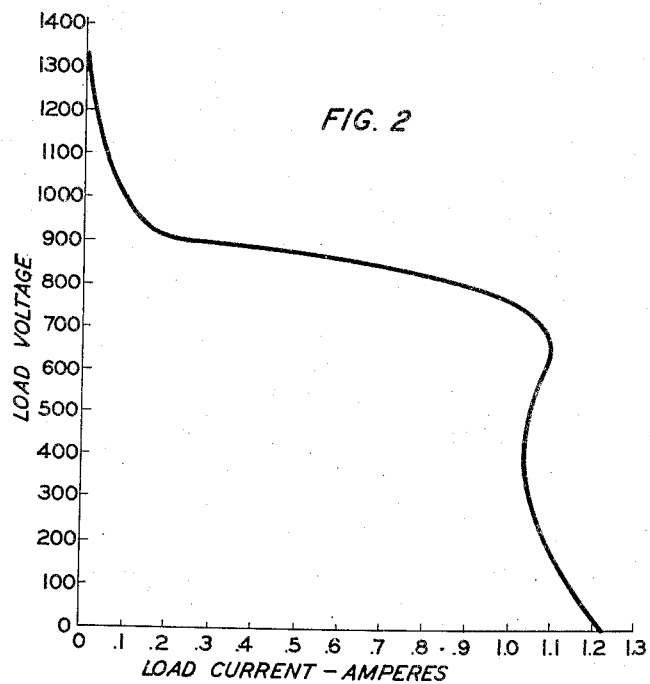

The invention will be readily understood from the following detailed description made with reference to the accompanying drawing in which:

Fig. 1 illustrates diagrammatically the preferred form of rectifier circuit embodying the features of this invention; and Fig. 2 shows a load current-load voltage curve which illustrates the regulation characteristic obtainable with the rectifier circuit shown in Fig. 1.

Referring to Fig. 1 of the drawing, there is illustrated an apparatus for converting alternating current from the circuit 10 into direct current and transmitting the rectified current to a receiving circuit 11 which supplies the load indicated at 12.

The apparatus includes a transformer 15 and the vapor electric discharge devices 16 and 17 each provided with an anode, a cathode and a control grid. The primary winding of transformer 15 is connected to the alternating current supply circuit 10. The secondary winding of transformer 15 has one terminal thereof connected to the anode of the tube 16, its other terminal connected to the anode of tube 17 and a midpoint terminal connected to the negative side of the direct current load circuit 12 by way of the choke coil 30.

The cathodes of tubes 16 and 17 are connected together to the positive side of the load by way of the non-linear resistance element 18. In the present instance, this resistance 18 comprises a ballast lamp having a characteristic such that when traversed by current below its rated value the voltage drop across its terminals remains substantially constant, whereas for currents above its rated value the voltage drop across its terminals rises rapidly.

The grids of tubes 16 and 17 are connected together through their respective grid leaks 20 and 21 to the positive terminal of the load 12 to which one terminal of the ballast lamp 18 is also connected.

As the current in the rectifier circuit travels in the direction indicated by the arrow, it will be noted that the potential drop across the lamp 18 is negative with respect to the tube grids, that is, a negative bias is applied to the grids due to the potential drop across the non-linear resistance 18.

As the load current increases from any value below full load value of one ampere, for example, the potential drop across the lamp 18 remains substantially constant due to the characteristic of the ballast lamp, with the result that the grid bias remains substantially constant. The output voltage of the rectifier accordingly is maintained substantially constant. As the load current increases beyond the selected full load value of one ampere, the current through the ballast lamp exceeds its rated value (of one ampere) with the result that the potential drop across its terminals rises rapidly thereby causing the negative grid bias to be increased to such an extent as to cause the rectifier output voltage to fall rapidly and assume a condition of zero voltage as indicated by the curve in Fig. 2.

From the foregoing description, it is apparent that the rectifier has a substantially constant load voltage-load current characteristic up to full load and is incapable of carrying an overload.

It will be understood that should it be desirable that the rectifier have a drooping load voltage-load current characteristic, the resistor 18 may be a linear resistance or a resistance which obeys Ohm's law. In this case also, the rectifier would not carry an overload. If the load terminals are short-circuited, the load voltage falls to zero and the load current does not rise alarmingly.

What is claimed is:

1. In combination, a direct current load, an alternating current supply, an electric valve connected to rectify the current from said supply and transmit the rectified current to said load, said valve having a control grid and means for maintaining a substantially constant potential on said control grid for direct current loads up to a predetermined limit and for rapidly changing the grid potential when the direct current load exceeds the predetermined limit, said means including a non-linear resistance connected in series with the load.

2. In combination, a direct current load having a predetermined full load value, an alternating current supply, a grid controlled rectifier connected to rectify the current from said supply and transmit the rectified current to said load, and means for controlling the biasing potential on the grid of said rectifier, said means including a resistance connected across the grid-filament elements of the rectifier and in series with the load circuit and having a characteristic such that for currents below the predetermined full load value it maintains the grid bias substantially constant and for currents in excess of the full load value it causes a rapid increase in the grid bias.

GEORGE H. ROCKWOOD, Jr.